(12) United States Patent
Kandula

(10) Patent No.: US 11,586,583 B2
(45) Date of Patent: Feb. 21, 2023

(54) SYSTEMS AND METHODS FOR INGESTING DATA FILES USING MULTI-THREADED PROCESSING

(71) Applicant: CVS Pharmacy, Inc., Woonsocket, RI (US)

(72) Inventor: Pridhvi Raj Kandula, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 79 days.

(21) Appl. No.: 17/191,851

(22) Filed: Mar. 4, 2021

(65) Prior Publication Data
US 2022/0283986 A1    Sep. 8, 2022

(51) Int. Cl.
G06F 15/16    (2006.01)
G06F 16/11    (2019.01)
G06F 9/48     (2006.01)

(52) U.S. Cl.
CPC .......... *G06F 16/122* (2019.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2005/0049996 | A1* | 3/2005 | Srinivasan | G06F 16/83 707/E17.127 |
| 2008/0016106 | A1* | 1/2008 | Worrall | G06F 16/13 707/999.102 |
| 2012/0047090 | A1* | 2/2012 | Gunther | G06Q 40/06 705/36 R |
| 2017/0200153 | A1* | 7/2017 | Hewitt | G06F 16/258 |
| 2018/0165180 | A1* | 6/2018 | Savidge | G06F 11/3684 |
| 2018/0183462 | A1* | 6/2018 | Gopal | H03M 7/30 |
| 2020/0333971 | A1* | 10/2020 | Madan | G06F 3/0673 |

* cited by examiner

*Primary Examiner* — Alex Gofman
(74) *Attorney, Agent, or Firm* — Leydig, Voit & Mayer, Ltd.

(57) ABSTRACT

In some instances, a method for ingesting data files is provided. The method comprises: obtaining, by an ingestion system associated with a distributed file system, a data file from an external data source; determining, by the ingestion system, a plurality of processing threads within the ingestion system to use to process the data file; determining, by the ingestion system, one or more offsets within the data file based on the plurality of determined processing threads; and ingesting, by the ingestion system, the data file by having each of the plurality of processing threads begin processing the data file at a plurality of different locations within the data file, wherein the plurality of different locations are associated with the one or more offsets.

20 Claims, 5 Drawing Sheets

SYSTEMS AND METHODS FOR INGESTING DATA FILES USING MULTI-THREADED PROCESSING

BACKGROUND

A file system may receive many data files from many different sources. In some instances, these data files may be flat files such as a simple plain text file or binary file. The size of the data files may impact how fast the file system is able to ingest the data files. For example, typically, when the file system receives a data file (e.g., a data file from the LINUX file system), the file system (e.g., a HADOOP file system) may perform one or more operations (e.g., an "hdfs dfs -put" command) to convert this data file into an appropriate data file associated with the file system (e.g., convert the data file from LINUX file system into a HADOOP data file) and ingest the data file. When the data file is smaller in size, it may be fairly quick for the file system to ingest this data file. However, the file system may have to ingest numerous different data files that are typically substantial in size. Accordingly, with a large amount of data flowing into the file system, this may cause a bottleneck in the process of data ingestion.

Traditionally, by using the "hdfs dfs -put" command, the file system is able to transfer and ingest the contents of the data file using a single-threaded process (e.g., a single processing thread of a device or processor such as a central processing unit (CPU)). Other methods that have been used include splitting the file into multiple different pieces such as by using a UNIX split command and then using the "hdfs dfs -put" command. However, the time it takes to actually split the data file into multiple pieces is not instantaneous and in fact, may actually increase the overall time taken to ingest a file. In particular, regarding splitting the data files into separate data files and then ingesting the split data files, the overhead for this operation actually resides in the process splitting the data files as the time taken to split a file physically increases with the increase in file size. Accordingly, there remains a technical need to rapidly ingest data files into the file system.

SUMMARY

In some examples, the present application may provide a way to ingest a data file (e.g., a flat file) in a multi-threaded fashion (e.g., by using multiple different processing threads within a device or processor), which will lead to faster ingestion of the data files as well as having to spend the overhead to physically split the file first. In some instances, the present application may create and/or generate offsets within the data file using characteristics of the data file (e.g., by utilizing a command such as a RandomAccessFile class in JAVA to create offsets based on the row delimiter). These offsets may then be used to calculate the start points and number of bytes, which are then passed onto Channels in JAVA that are used to read, in parallel, the file contents and ingest into them into the file system (e.g., the HADOOP file system). In some variations, the present application may further determine a number of concurrent threads available to use to process the files in parallel such as determining the available threads within the device.

In one aspect, a method for ingesting data files is provided. The method comprises: obtaining, by an ingestion system associated with a distributed file system, a data file from an external data source; determining, by the ingestion system, a plurality of processing threads within the ingestion system to use to process the data file; determining, by the ingestion system, one or more offsets within the data file based on the plurality of determined processing threads; and ingesting, by the ingestion system, the data file by having each of the plurality of processing threads begin processing the data file at a plurality of different locations within the data file, wherein the plurality of different locations are associated with the one or more offsets.

Examples may include one of the following features, or any combination thereof. For instance, in some examples, the determining the one or more offsets comprises: determining a number of row delimiters within the data file; and determining the one or more offsets based on the number of row delimiters.

In some instances, determining the plurality of processing threads within the ingestion system to use to process the data file comprises determining a number of available processing threads for processing the data file, and determining the one or more offsets is based on the number of row delimiters within the data file and the number of available processing threads within the ingestion system.

In some variations, the method further comprises: capping a number of processing threads used to ingest the data file at the determined number of available processing threads; determining a new processing thread that is available for processing the data file; and continuing to ingest the data file based on the determined number of available processing threads.

In some instances, determining the plurality of processing threads within the ingestion system to use to process the data file is based on a file size of the data file.

In some examples, ingesting the data file comprises: instructing a first available processing thread, from the plurality of processing threads, to begin ingesting the data file at the beginning of the data file; and instructing a second available processing thread, from the plurality of processing threads, to begin ingesting the data file at a first offset, of the one or more offsets, within the data file.

In some variations, ingesting the data file further comprises: instructing a third available processing thread, from the plurality of processing threads, to begin ingesting the data file at a second offset, of the one or more offsets, within the data file.

In some instances, the data file is a LINUX flat file. The distributed file system is a HADOOP distributed file system. Further, ingesting the data file is based on converting the LINUX flat file into a HADOOP data file.

In some examples, determining the one or more offsets within the data file comprises: populating entries of an offset array indicating the plurality of different locations within the data file for each of the plurality of processing threads begins processing the data file. Each of the entries of the offset array is based on a size of the data file and the plurality of processing threads.

In some variations, populating the offset array comprises: determining a plurality of byte sizes to use for each of the entries of the offset array based on the size of the data file and the plurality of processing threads; determining whether content at a byte size, of the plurality of byte sizes, indicates an end of a row of the data file; and based on the content at the byte size indicating the byte size is at the end of the row, storing the byte size in the offset array.

In some instances, populating the offset array further comprises: based on the content at the byte size indicating the byte size is not at the end of the row, incrementing the byte size by one and determining whether second content at the incremented byte size indicates the end of the row; and based on the second content at the incremented byte size indicating the incremented byte size is at the end of the row, storing the incremented byte size in the offset array.

In another aspect, a multi-threaded ingestion system comprises one or more processors; and a non-transitory computer-readable medium having processor-executable instructions stored thereon, wherein the processor-executable instructions, when executed, facilitate: obtaining a data file from an external data source; determining a plurality of processing threads associated with the one or more processors to use to process the data file; determining one or more offsets within the data file based on the plurality of determined processing threads; and ingesting the data file by having each of the plurality of processing threads begin processing the data file at a plurality of different locations within the data file, wherein the plurality of different locations are associated with the one or more offsets.

Examples may include one of the following features, or any combination thereof. For example, in some instances, determining the one or more offsets comprises: determining a number of row delimiters within the data file; and determining the one or more offsets based on the number of row delimiters.

In some examples, determining the plurality of processing threads to use to process the data file comprises determining a number of available processing threads for processing the data file, and determining the one or more offsets is based on the number of row delimiters within the data file and the number of available processing threads.

In some variations, the processor-executable instructions, when executed, further facilitate: capping a number of processing threads used to ingest the data file at the determined number of available processing threads; determining a new processing thread that is available for processing the data file; and continuing to ingest the data file based on the determined number of available processing threads.

In some instances, determining the plurality of processing threads to use to process the data file is based on a file size of the data file.

In some examples, ingesting the data file comprises: instructing a first available processing thread, from the plurality of processing threads, to begin ingesting the data file at the beginning of the data file; and instructing a second available processing thread, from the plurality of processing threads, to begin ingesting the data file at a first offset, of the one or more offsets, within the data file.

In some variations, ingesting the data file further comprises: instructing a third available processing thread, from the plurality of processing threads, to begin ingesting the data file at a second offset, of the one or more offsets, within the data file.

In some instances, the data file is a LINUX flat file, and ingesting the data file is based on converting the LINUX flat file into a HADOOP data file.

In yet another aspect, a non-transitory computer-readable medium having processor-executable instructions stored thereon, wherein the processor-executable instructions, when executed, facilitate: obtaining a data file from an external data source; determining a plurality of processing threads within an ingestion system to use to process the data file; determining one or more offsets within the data file based on the plurality of determined processing threads; and ingesting the data file by having each of the plurality of processing threads begin processing the data file at a plurality of different locations within the data file, wherein the plurality of different locations are associated with the one or more offsets.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Examples of the presented application will now be described more fully hereinafter with reference to the accompanying FIGS, in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
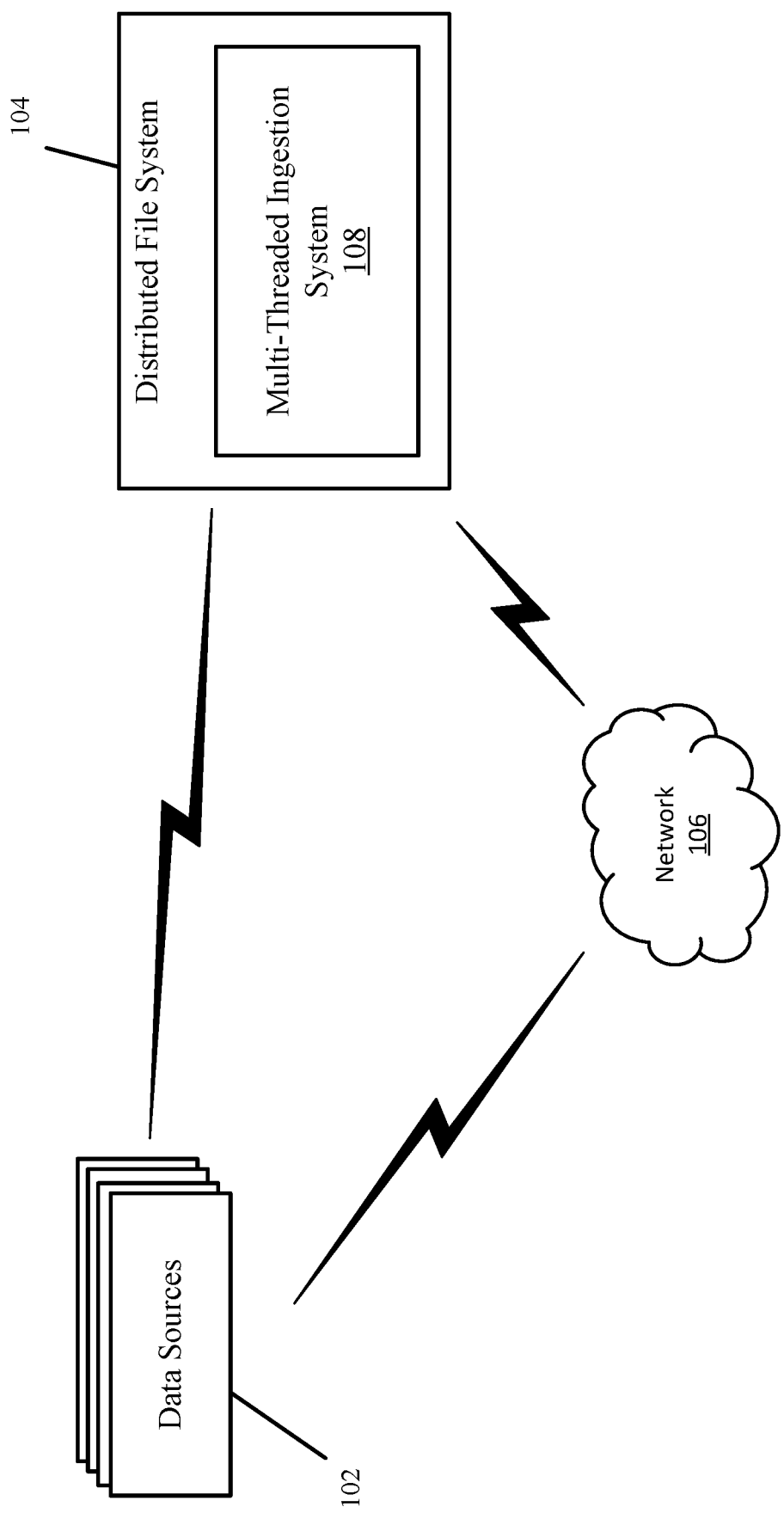
FIG. 1 is a simplified block diagram depicting an exemplary computing environment in accordance with one or more examples of the present application.

Systems, methods, and computer program products are herein disclosed that provide for ingesting data files using multi-threaded processing. FIG. 1 is a simplified block diagram depicting an exemplary environment in accordance with an example of the present application. The environment 100 includes one or more data sources 102, a distributed file system 104, and a network 106. Although the entities within environment 100 may be described below and/or depicted in the FIGS. as being singular entities, it will be appreciated that the entities and functionalities discussed herein may be implemented by and/or include one or more entities.

The entities within the environment 100 such as the data sources 102 and the distributed file system 104 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the data sources 102 may be in communication with the distributed file system 104 without using the network 106. For instance, the data sources 102 may use one or more wired connections and/or one or more communication protocols such as WI-FI or BLUETOOTH to communicate with the distributed file system 104.

Each of the data sources 102 is and/or includes one or more computing devices and/or systems that are configured to provide data (e.g., data files) to the distributed file system 104. For example, the data sources 102 are and/or include one or more computing devices, computing platforms, systems, servers, desktops, laptops, tablets, mobile devices (e.g., smartphone device, or other mobile device), or any other type of computing device that generally comprises one or more communication components, one or more processing components, and one or more memory components.

The data sources 102 are capable of performing tasks, functions, and/or other actions. For example, the data sources 102 may provide data such as one or more data files to the distributed file system. The data files may be any type of data file that includes information. For example, in some variations, the data files may be a flat file, a comma-separated value (CSV) file, a portable document format (PDF) file, a document (DOC) file, a compressed file (e.g., a ZIP file), an optimized row columnar (ORC) file, a PARQUET file, an AVRO file, a JAVASCRIPT Object Notation (JSON) file, an extensible markup language (XML) file, and/or another file type. The data file may include information and each of the data sources 102 may provide one or more of these data files to the distributed file system 104.

In some variations, the data sources 102 may be implemented as engines, software functions, and/or applications. In other words, the functionalities of the data sources 102 may be implemented as software instructions stored in storage (e.g., memory) and executed by one or more processors.

The distributed file system 104 is a computing system that is associated with an enterprise organization. The enterprise organization may be any type of corporation, company, organization, and/or other institution. In some examples, the distributed file system 104 is a HADOOP file system. In other words, the distributed filed system 104 operates using a HADOOP framework. The distributed file system 104 includes one or more computing devices, computing platforms, systems, servers, desktops, laptops, tablets, mobile devices (e.g., smartphone device, or other mobile device), or any other type of computing device that generally comprises one or more communication components, one or more processing components, and one or more memory components.

The distributed file system 104 is capable of performing tasks, functions, and/or other actions for the enterprise organization. For example, the distributed file system 104 includes a multi-threaded ingestion system 108 that obtains (e.g., receives and/or retrieves) data files from the data sources 102. Then, the multi-threaded ingestion system 108 ingests the data files into the distributed file system 104 using multiple different threads (e.g., processing threads or threads of execution). For example, the multi-threaded ingestion system 108 may include one or more processors such as central processing units (CPUs). The processor may include one or more physical cores (e.g., CPU cores) or processing units, which are pieces of logic capable of independent performing the functions of the processor. The physical cores may include multiple different threads of execution that can execute multiple different tasks at one time. For instance, each of the threads of execution may be executing programming code independent of each other. By using multiple threads that executed at simultaneously (e.g., multi-threaded processing), the processor may perform multiple tasks at the same time. The multi-threaded ingestion system 108 may use multiple threads to process each data file that is received from the data sources 102. This will be described in further detail below.

In some instances, the data sources 102 may be using a first operating system/framework such as a LINUX operating system and the distributed file system 104 using a second framework such as a HADOOP framework. Using multiple different threads of execution, the multi-threaded ingestion system 108 ingests the data files from the first operating system/framework so that they are compatible with the second framework (e.g., the HADOOP framework). For instance, the multi-threaded ingestion system 108 provides instructions for each thread to read file characters from the data file 412 and copy these characters into the distributed file system 104.

In some examples, the multi-threaded ingestion system 108 may create/generate one or more offsets for ingesting the data file. For example, the multi-threaded ingestion system 108 may determine offsets within the data file based on characteristics of the data file (e.g., delimiters such as row delimiters and/or the size of the data file). For instance, after each row within the data file, the data file may include one or more characters such as "\n" to indicate the next row of the data file. The one or more characters may be row delimiters. The multi-threaded ingestion system 108 may determine an amount of delimiters (e.g., row delimiters) within the received data file. Then, based on the amount of delimiters and number of available processing threads, the multi-threaded ingestion system 108 may generate one or more offsets within the data file. After, the multi-threaded ingestion system 108 may use the generated offsets and the processing threads to ingest the data file. For instance, a processing thread may begin ingesting the data file at the beginning and each of the other available processing threads may begin ingesting the data file at the generated offsets. Additionally, and/or alternatively, the multi-threaded ingestion system 108 may generate the one or more offsets based on the size of the data file (e.g., each thread may be tasked with ingesting an equal or substantially equal part of the data file).

In some variations, the distributed file system 104 may be implemented as engines, software functions, and/or applications. In other words, the functionalities of the distributed file system 104 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by health care enterprise organizations. However, in other instances, the environment 100 may be used by other types of enterprise organizations such as financial institutions or insurance institutions.

Figure 2:
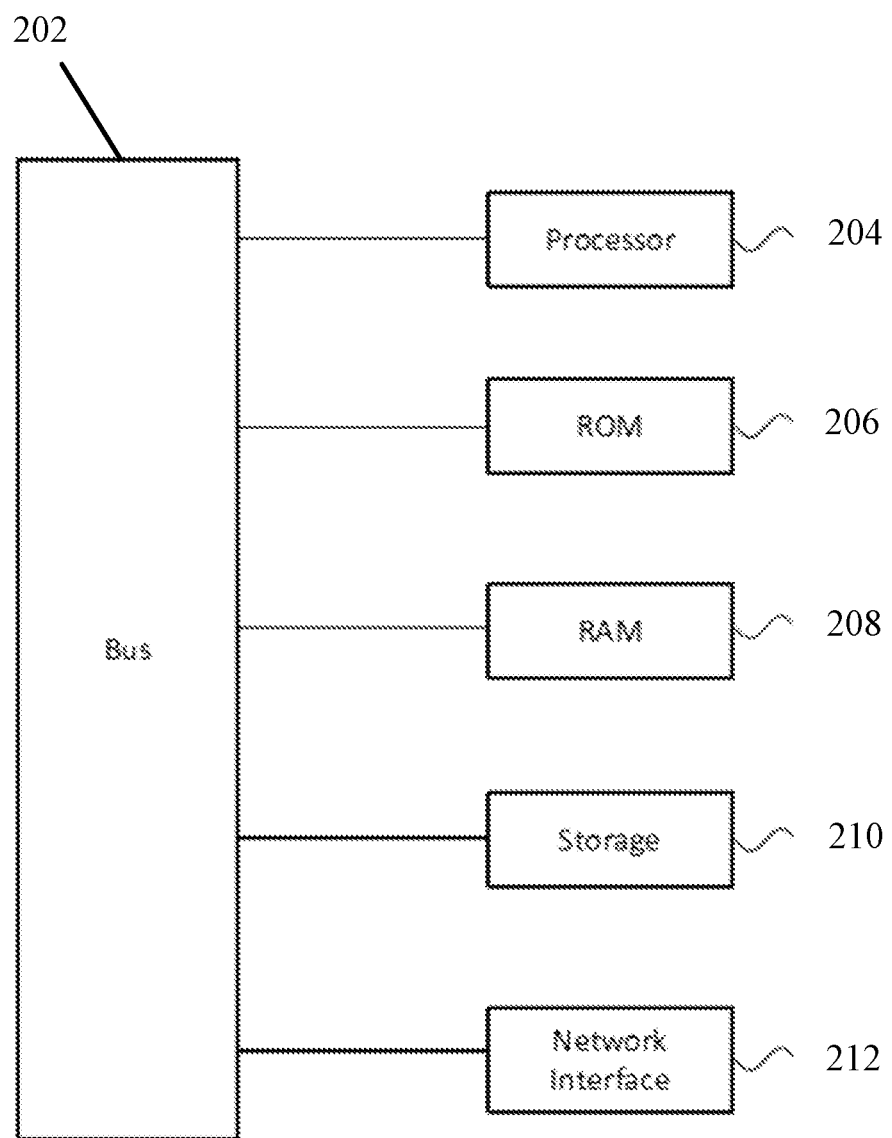
FIG. 2 is a simplified block diagram of one or more devices or systems within the exemplary environment of FIG. 1.

FIG. 2 is a block diagram of an exemplary system and/or device 200 (e.g., the data sources 102, the distributed file system 104, and/or the multi-threaded ingestion system 108)

within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. For example, the distributed file system 104 and the multi-threaded ingestion system 108 may include some of the components within the device/system 200 and may also include additional and/or alternative components. Additionally, and/or alternatively, the device/system 200 may further include components that might not be included within every entity of environment 100.

Figure 3:
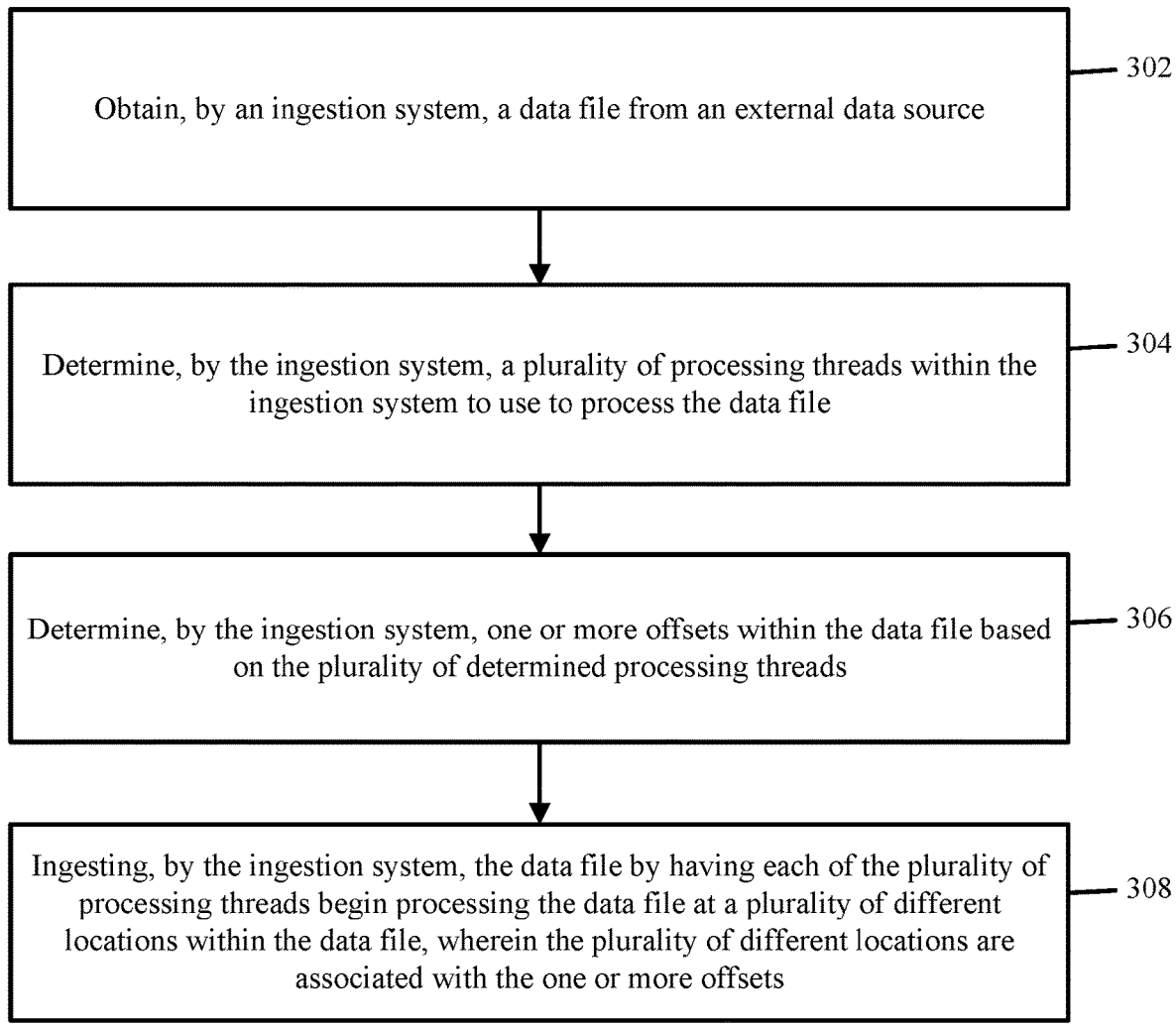
FIG. 3 is an exemplary process for ingesting data files using multi-threaded processing in accordance with one or more examples of the present application.

FIG. 3 is an exemplary process 300 for ingesting data files using multi-threaded processing in accordance with one or more examples of the present application. The process 300 may be performed by the distributed file system 104 and/or the multi-threaded ingestion system 108 of environment 100 shown in FIG. 1. However, it will be recognized that the process 300 may be performed in any suitable environment and that any of the following blocks may be performed in any suitable order.

Figure 4:
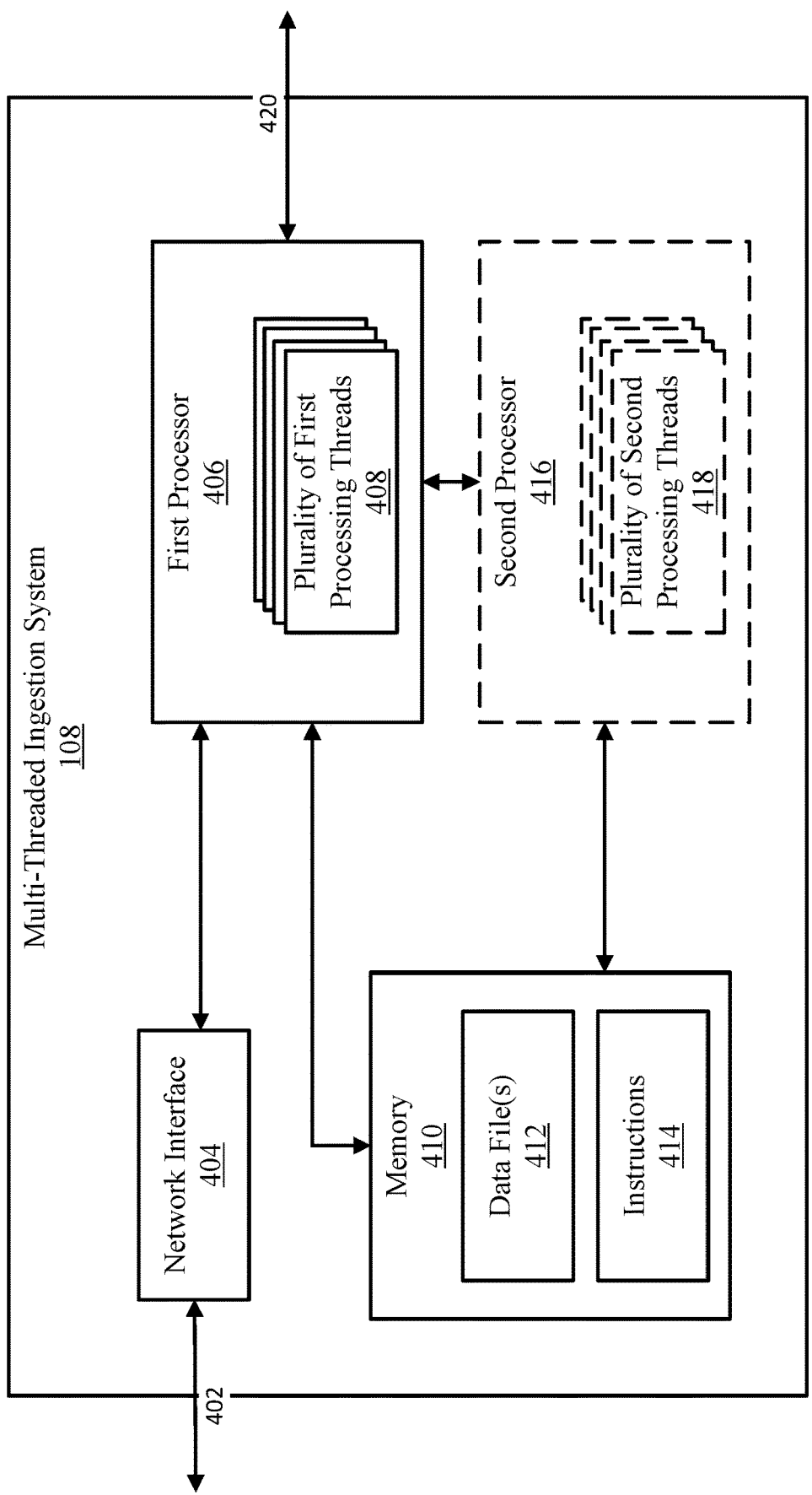
FIG. 4 is another simplified block diagram depicting a multi-threaded ingestion system in accordance with one or more examples of the present application.

FIG. 4 is a simplified block diagram depicting the multi-threaded ingestion system 108 in accordance with one or more examples of the present application and will be used to describe process 300 in more detail. In particular, the multi-threaded ingestion system 108 includes the network interface 404, a first processor (e.g., CPU) 406, and memory 410. Optionally, which is denoted by the dotted lines, the multi-threaded ingestion system 108 further includes a second processor 416. The network interface 404 may be and/or have similar functionality to the network interface 212. For example, the multi-threaded ingestion system 108 may use the network interface 404 to communicate with other entities within the environment 100. For instance, the multi-threaded ingestion system 108 may receive information 402 such as the data files (e.g., flat files) from the data sources 102 either directly, via the network 106, and/or via other devices.

The first processor 406 may include a plurality of first processing threads 408 (e.g., a plurality of threads of execution). As mentioned above, the first processor 406 may be a CPU that includes one or more processing cores. The processing cores may include threads of execution such as the plurality of processing threads 408. The plurality of first processing threads 408 may perform functions for the first processor 406 such as ingesting the data files that are received from the data sources 102.

The memory 410 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM such as the RAM 208), a ROM such as ROM 206, an erasable programmable read-only memory (EPROM or Flash memory), a compact disc read-only memory (CD_ROM), or other tangible optical or magnetic storage device. The computer-readable medium may store computer-readable instructions 414/program code for carrying out operations of the present application. For example, when executed by the first and/or second processors 406 and 416, the computer-readable instructions/program code may carry out operations described herein.

The memory 410 may further store the data files 412 that are received from the data sources 102. For example, after receiving the data files 412, the multi-threaded ingestion system 108 (e.g., the first processor 406) may store the data files 412 in memory 410. Then, as will be explained below, the first and/or second processors 406 and/or 416 may use their processing threads 408 and/or 418 to ingest the data files 412 that are stored in memory 410.

The second processor 416, when present, may include a plurality of second processing threads 418. The second processor 416, including the second processing threads 418, may operate similarly to the first processor 406 and the first processing threads 408. In other words, the second processing threads 418 may be used to ingest the data files 412 that are received from the data sources 102. Only two processors (e.g., first and second processors 406 and 416) are shown in FIG. 4 solely for clarity and brevity, and the multi-threaded ingestion system 108 may include numerous processors and each of these processors may include their own processing threads that may be used to ingest the data files 412.

The descriptions, illustrations, entities, and processes of FIGS. 3 and 4 are merely exemplary and the process 300 and/or the multi-threaded ingestion system 108 may use other descriptions, illustrations, and processes for ingesting data files using multi-threaded processing.

Referring back to FIG. 3, in operation, at block 302, the multi-threaded ingestion system 108 obtains (e.g., receives and/or retrieves) a data file from an external data source such as the one or more data sources 102. For example, using the network interface 404, the multi-threaded ingestion system 108 may receive information 402 such as one or more data files 412. In some instances, the multi-threaded ingestion system 108 may store the data file 412 in memory 410. After storing the data file 412 in memory 410, the multi-threaded ingestion system 108 may ingest the data file 412, which is described below in blocks 304-308. In other instances, the multi-threaded ingestion system 108 may begin ingesting the data files 412 without storing the files 412 in memory 410 first.

In some examples, the data file may be a flat file and/or in another file format as described above. Additionally, and/or alternatively, the data file may be in a first framework such as a LINUX framework and the distributed file system 104 that includes the multi-threaded ingestion system 108 may be in another framework such as a HADOOP framework.

At block 304, the multi-threaded ingestion system 108 determines a plurality of processing threads within the ingestion system 108 to use to process (e.g., ingest) the data file. For instance, the multi-threaded ingestion system 108 may determine a number of processing threads (e.g., from the first and/or second processing threads 408 and 418 of the first and/or second processors 406 and 416) to use to ingest the data file 412 that was obtained at block 302.

In some instances, the multi-threaded ingestion system 108 may determine the plurality of processing threads to use for ingesting the data file based on determining a number of available processing threads that are within the multi-threaded ingestion system 108. The available processing threads may be threads that are available and able to used for ingesting the data file 412. For instance, one or more of the processing threads (e.g., the threads 408 and/or 418) may be executing other operations and not available (e.g., not idle). For example, two or more data files may be ingested by the multi-threaded ingestion system 108 at the same time. The first data file may be ingested using a first subset of processing threads from the threads 408 and/or 418. These first subset of processing threads might not be available for ingesting the second data file (e.g., the data file 412). Therefore, the multi-threaded ingestion system 108 may determine the processing threads that are available for ingestion of the data file 412 (e.g., the threads that are not being used to ingest the first data file and/or executing other applications, programs, and/or instructions). In some examples, the multi-threaded ingestion system 108 may use one or more commands and/or logic to determine (e.g., calculate) the number of processing threads within the multi-threaded ingestion system 108 and/or the number of processing threads that are available at that point in time to use to ingest the data file 412.

In some variations, the multi-threaded ingestion system 108 may determine the plurality of processing threads to use for ingesting the data file 412 based on the size of the data file 412. For example, based on comparing the size of the data file 412 with one or more thresholds, the multi-threaded ingestion system 108 may determine the number of processing threads to use for ingesting the data file 412. For instance, based on the data file size being under 128 megabytes (MB), the multi-threaded ingestion system 108 may use one processing thread for ingesting the data file. Based on the data file size being between 128 MB and 256 MB, the multi-threaded ingestion system 108 may use two processing threads. Based on the data file size being between 256 MB and 384, the multi-threaded ingestion system 108 may use three processing threads, and so on.

In some instances, the multi-threaded ingestion system 108 may use both the size of the data file 412 as well as the number of available processing threads to determine the plurality of processing threads to use for ingesting the data file 412. For instance, based on the data file size, the multi-threaded ingestion system 108 may determine to use a number of threads such as five threads. The multi-threaded ingestion system 108 may determine, however, that only four threads are available. Therefore, the multi-threaded ingestion system 108 may compare these two values and may determine the plurality of processing threads to use for ingesting the data file 412 based on the lower value and/or another metric.

At block 306, the multi-threaded ingestion system 108 determines one or more offsets within the data file based on the plurality of determined processing threads. For example, the multi-threaded ingestion system 108 may use one or more characteristics of the data file 412 to determine the location of the one or more offsets. For instance, as mentioned above, the data file 412 may include a plurality of row delimiters (e.g., the characters "\n"), which may appear after each row of the data file 412. The multi-threaded ingestion system 108 may determine the number of these row delimiters within the data file 412. Then, based on the number of the row delimiters and the number of processing threads to process the data file 412, which was determined at block 304, the multi-threaded ingestion system 108 may determine the number of offsets to use for the data file 412 as well as the locations of these offsets within the data file 412. For example, the multi-threaded ingestion system 108 may determine there are 1,000 row delimiters (e.g., 1,000 rows) within the data file 412 and five processing threads to use to process the data file 412. Based on these numbers, the multi-threaded ingestion system 108 may determine to use four offsets (e.g., the five processing threads minus the one processing thread that begins at the beginning of the data file 412) and that the location of these offsets within the data file 412 should be at the 200 row mark, 400 row mark, 600 row mark, and 800 row mark.

In some instances, the multi-threaded ingestion system 108 may generate and/or create one or more pointers at the locations of these offsets. For instance, referring to the example above, the multi-threaded ingestion system 108 may generate four pointers—one at the 200 row mark, one at the 400 row mark, one at the 600 row mark, and one at the 800 row mark.

At block 308, the multi-threaded ingestion system 108 ingests the data file by having each of the plurality of processing threads begin processing the data file at a plurality of locations within the data file 412. The plurality of different locations are associated with the one or more offsets. For example, the multi-threaded ingestion system 108 may ingest the data file 412 using the determined offsets from block 306. For instance, the multi-threaded ingestion system 108 may provide one or more instructions and/or commands to the first processing thread, of the plurality of determined processing threads, to begin ingesting the data file 412 at the beginning of the data file 412. Further, the multi-threaded ingestion system 108 may provide one or more instructions to the second processing thread to begin ingesting the data file 412 at the location of the first offset (e.g., at the 200 row mark), the third processing thread to begin ingesting the data file 412 at the location of the second offset (e.g., at the 400 row mark), and so on.

In other words, the multi-threaded ingestion system 108 determines a number of processing threads to use to ingest the data file 412 and offsets within the data file 412 to use for the processing threads. The multi-threaded ingestion system 108 then begins ingesting the files using the offsets such that a different processing thread begins ingesting the data file 412 at each of the offsets. By using these different offsets and processing threads, the multi-threaded ingestion system 108 is capable of increasing the speed at which the data file 412 is ingested within the distributed file system 104.

In some instances, the multi-threaded ingestion system 108 may ingest the data file 412 using multiple files so as to avoid a file lock. For instance, a file lock may be when a file system does not allow multiple processes to write into the same file at the same time. To avoid the file lock, the multi-threaded ingestion system 108 may use multiple different processing threads to write to multiple different "part" files (e.g., files with different names). For example, the processing threads may be ingesting the data file 412, and each of the threads may be writing the information from the data file 412 into a different "part" file.

In some examples, after the data file 412 has already begun being ingested (e.g., after block 308), the multi-threaded ingestion system 108 may re-assess the number of processing threads (e.g., processing threads 408 and/or 418)

to use to ingest the data file 412. In other examples, the multi-threaded ingestion system 108 may set the maximum number of processing threads to use to ingest the file as the number of processing threads that was determined at block 304. For example, at block 304, the multi-threaded ingestion system 108 may determine a certain number of processing threads (e.g., five threads). Then, after block 308 and the beginning of the ingestion process, the multi-threaded ingestion system 108 may determine one or more new processing threads that has become available. For instance, as mentioned above, the multi-threaded ingestion system 108 may be ingesting multiple different data files. After one of these data files has been completed, then the processing threads that are used to process this data file may become available. However, after block 308 and after the ingestion process begins, the multi-threaded ingestion system 108 might not use the newly available processing threads to process the data file.

In some variations, the multi-threaded ingestion system 108 determines the offsets based on the size of the data file 412 and the determined processing threads to use to process the data file 412 from block 304. For example, the data file 412 may be 500 bytes and at block 304, the multi-threaded ingestion system 108 may determine to use four processing threads for processing the data file 412. The multi-threaded ingestion system 108 may generate and/or create an offset array with four slots. Each of these slots indicates a location (e.g., a pointer) within the data file 412 for one of the four processing threads to begin ingesting the data file 412. For instance, the first slot may be zero, which indicates that the first processing thread begins at the beginning of the data file 412.

The multi-threaded ingestion system 108 may traverse through the file to populate the rest of the offset array. For instance, the multi-threaded ingestion system 108 may determine a byte value for one of the processing threads to begin ingesting the data file 412 based on the size of the data file 412 and the determined processing threads. For example, the multi-threaded ingestion system 108 may seek for each of the processing threads to process a similar amount of data from the data file 412. Thus, based on the determined processing threads being four and the size of the data file 412 being 500 bytes, the multi-threaded ingestion system 108 may determine the offsets as multiples of 125 bytes (e.g., 500 bytes divided by four).

In some instances, the determined byte value for one of the processing threads to begin ingesting the data file 412 may be in the middle of the row or at the end of the data file 412 and the multi-threaded ingestion system 108 may attempt to keep each of the rows together. As such, the multi-threaded ingestion system 108 may check whether the data associated with the byte value (e.g., the content within the data file 412 at the byte value) indicates an end of the row (e.g., the "\n" character as described above) and/or an end of the file (e.g., a "−1" character). Based on the content at the byte value indicating the end of the row or end of the file, the multi-threaded ingestion system 108 may populate the byte value (e.g., 125) into the offset array. Based on the content at the byte value not indicating the end of the row or end of the file, the multi-threaded ingestion system 108 may move onto the next byte value and check whether the data (e.g., content) at the next byte value indicates an end of row or end of file. The multi-threaded ingestion system 108 may continue with moving onto the next byte and checking whether the next byte value indicates an end of row or end of file until it reaches the end of the row or the end of the file.

Then, the multi-threaded ingestion system 108 may populate this byte value into the offset array.

After populating the entries of the offset array, the process 300 may move to block 308 and the multi-threaded ingestion system 108 may ingest the data file 412 using the entries of the array. For instance, the offset array may indicate 0 bytes, 133 bytes, 277 bytes, and 415 bytes. Each of the processing threads may begin ingesting the data file 412 at those byte markers.

In other words, each of the rows of the data file 412 may be different sizes (e.g., byte sizes). For instance, the first row may have more data than the second row and as such, the first row may be ten bytes whereas the second row may be five bytes. Accordingly, in some examples, rather than ingesting the data file 412 by rows as described above, the multi-threaded ingestion system 108 may ingest the data file 412 based on the rows as well as actual file size of data file 412.

Figure 5:
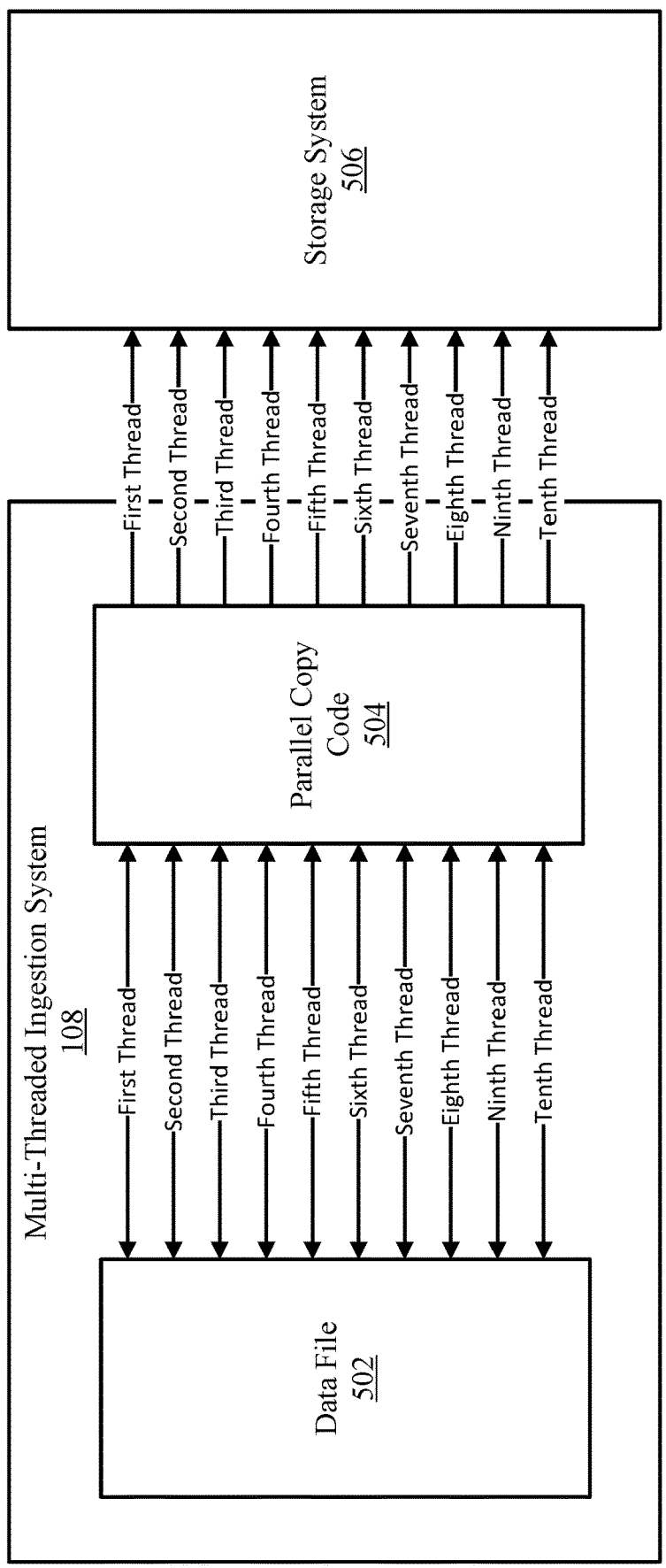
FIG. 5 is another simplified block diagram depicting the ingestion of data files into a storage system in accordance with one or more examples of the present application.

FIG. 5 shows another simplified block diagram 500 depicting the ingestion of data files into a storage system in accordance with one or more examples of the present application. For example, the block diagram 500 shows a data file 502 to be ingested into the storage system 506 of the distributed file system 104 using the multi-threaded processing described above. The multi-threaded ingestion system 108 may determine the number of processing threads (e.g., ten) to use for ingesting the data file as well as the offsets for the processing threads.

Then, at block 308, the multi-threaded ingestion system 108 may ingest the data file 502. For example, the multi-threaded ingestion system 108 may use a parallel copy code 504 that copies and/or performs other operations in order to ingest the data file 412 into the storage system 506. As shown, the multi-threaded ingestion system 108 may use the ten determined threads to both copy the data file 502 as well as to store the contents within the storage system 506. The storage system 506 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM such as the RAM 208), a ROM such as ROM 206, an erasable programmable read-only memory (EPROM or Flash memory), a compact disc read-only memory (CD_ROM), or other tangible optical or magnetic storage device.

In some variations, the parallel copy code 504 may calculate a number of rows within the data file 502, determine the memory and number of threads available within the multi-threaded ingestion system 108 to use for ingesting the data file 502, create offsets in the data file 502 to feed to each of the threads (e.g., calculating offsets using row delimiters and/or ensuring the data contents/words are not split into pieces), enable each individual thread to operate in parallel and consume/write its respective chunk of data into the storage system 506, and/or stop the processing threads after the thread has finished copying its portion of the data file 502 such that the memory may be released back to the multi-threaded ingestion system 108 for use in ingesting another data file and/or other operations.

In some instances, the data file (e.g., 412 and/or 502) may be a compressed file such as a ZIP file. The multi-threaded ingestion system 108 may ingest the compressed file with or without decompressing the file first. For instance, the multi-threaded ingestion system 108 may ingest the compressed file without decompressing the file first, which may assist in achieving faster file ingestions.

In some examples, the multi-threaded ingestion system 108 may stich files together into a single file and then ingest the single file using process 300. For instance, the multi-threaded ingestion system 108 may use a MapReduce program to merge multiple files together into one file prior to ingesting the file.

In some variations, the multi-threaded ingestion system 108 may perform file level changes (e.g., a "sed" command on UNIX) prior to ingesting the data file. For instance, the file level changes may include changes to the column delimiter, remove special characters that may not be readable by the file ingestion system 104 (e.g., the HADOOP file ingestion system), and/or add/remove header and trailer records.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method for ingesting data files, comprising:
    obtaining, by an ingestion system associated with a distributed file system, a data file from an external data source;
    determining, by the ingestion system, a plurality of processing threads within the ingestion system to use to process the data file;
    determining, by the ingestion system, one or more offsets within the data file, wherein determining the one or more offsets within the data file comprises populating entries of an offset array indicating a plurality of different locations within the data file for each of the plurality of processing threads to begin processing the data file, wherein each of the entries of the offset array is based on a size of the data file, the plurality of processing threads, and a row delimiter indicating an end of a row of the data file; and
    ingesting, by the ingestion system, the data file by having each of the plurality of processing threads begin processing the data file at the plurality of different locations within the data file, wherein the plurality of different locations are associated with the one or more offsets, and
    wherein populating the entries of the offset array comprises:
        determining a plurality of byte sizes to use for each of the entries of the offset array based on the size of the data file and the plurality of processing threads;
        determining whether content at a byte size, of the plurality of byte sizes, indicates the row delimiter; and
        based on the content at the byte size indicating the byte size is at the row delimiter, storing the byte size in the offset array.

2. The method of claim 1, wherein determining the plurality of processing threads within the ingestion system to use to process the data file comprises determining a number of available processing threads for processing the data file, and
    wherein determining the one or more offsets is further based on the number of available processing threads within the ingestion system.

3. The method of claim 2, further comprising:
    capping a number of processing threads used to ingest the data file at the determined number of available processing threads;
    determining a new processing thread that is available for processing the data file; and
    continuing to ingest the data file based on the determined number of available processing threads.

4. The method of claim 1, wherein ingesting the data file comprises:
    instructing a first available processing thread, from the plurality of processing threads, to begin ingesting the data file at the beginning of the data file; and
    instructing a second available processing thread, from the plurality of processing threads, to begin ingesting the data file at a first offset, of the one or more offsets, within the data file.

5. The method of claim 4, wherein ingesting the data file further comprises:

instructing a third available processing thread, from the plurality of processing threads, to begin ingesting the data file at a second offset, of the one or more offsets, within the data file.

6. The method of claim 1, wherein ingesting the data file is based on converting the data file into a HADOOP data file.

7. The method of claim 1, wherein populating the entries of the offset array further comprises:
- based on the content at the byte size indicating the byte size is not the row delimiter, incrementing the byte size by one and determining whether second content at the incremented byte size indicates the row delimiter; and
- based on the second content at the incremented byte size indicating the incremented byte size is the row delimiter, storing the incremented byte size in the offset array.

8. A multi-threaded ingestion system, comprising:
one or more processors; and
a non-transitory computer-readable medium having processor-executable instructions stored thereon, wherein the processor-executable instructions, when executed, facilitate:
- obtaining a data file from an external data source;
- determining a plurality of processing threads associated with the one or more processors to use to process the data file;
- determining one or more offsets within the data file, wherein determining the one or more offsets within the data file comprises populating entries of an offset array indicating a plurality of different locations within the data file for each of the plurality of processing threads to begin processing the data file, wherein each of the entries of the offset array is based on a size of the data file, the plurality of processing threads, and a row delimiter indicating an end of a row of the data file; and
- ingesting the data file by having each of the plurality of processing threads begin processing the data file at the plurality of different locations within the data file, wherein the plurality of different locations are associated with the one or more offsets, and
wherein populating the entries of the offset array comprises:
- determining a plurality of byte sizes to use for each of the entries of the offset array based on the size of the data file and the plurality of processing threads;
- determining whether content at a byte size, of the plurality of byte sizes, indicates the row delimiter; and
- based on the content at the byte size indicating the byte size is at the row delimiter, storing the byte size in the offset array.

9. The multi-threaded ingestion system of claim 8, wherein determining the plurality of processing threads to use to process the data file comprises determining a number of available processing threads for processing the data file, and
wherein determining the one or more offsets is further based on the number of available processing threads.

10. The multi-threaded ingestion system of claim 9, wherein the processor-executable instructions, when executed, further facilitate:
- capping a number of processing threads used to ingest the data file at the determined number of available processing threads;
- determining a new processing thread that is available for processing the data file; and
- continuing to ingest the data file based on the determined number of available processing threads.

11. The multi-threaded ingestion system of claim 8, wherein ingesting the data file comprises:
- instructing a first available processing thread, from the plurality of processing threads, to begin ingesting the data file at the beginning of the data file; and
- instructing a second available processing thread, from the plurality of processing threads, to begin ingesting the data file at a first offset, of the one or more offsets, within the data file.

12. The multi-threaded ingestion system of claim 11, wherein ingesting the data file further comprises:
- instructing a third available processing thread, from the plurality of processing threads, to begin ingesting the data file at a second offset, of the one or more offsets, within the data file.

13. The multi-threaded ingestion system of claim 8, wherein ingesting the data file is based on converting the data file into a HADOOP data file.

14. The multi-threaded ingestion system of claim 8, wherein populating the entries of the offset array further comprises:
- based on the content at the byte size indicating the byte size is not the row delimiter, incrementing the byte size by one and determining whether second content at the incremented byte size indicates the row delimiter; and
- based on the second content at the incremented byte size indicating the incremented byte size is the row delimiter, storing the incremented byte size in the offset array.

15. A non-transitory computer-readable medium having processor-executable instructions stored thereon, wherein the processor-executable instructions, when executed, facilitate:
- obtaining a data file from an external data source;
- determining a plurality of processing threads within an ingestion system to use to process the data file;
- determining one or more offsets within the data file, wherein determining the one or more offsets within the data file comprises populating entries of an offset array indicating a plurality of different locations within the data file for each of the plurality of processing threads to begin processing the data file, wherein each of the entries of the offset array is based on a size of the data file, the plurality of processing threads, and a row delimiter indicating an end of a row of the data file; and
- ingesting the data file by having each of the plurality of processing threads begin processing the data file at the plurality of different locations within the data file, wherein the plurality of different locations are associated with the one or more offsets, and
wherein populating the entries of the offset array comprises:
- determining a plurality of byte sizes to use for each of the entries of the offset array based on the size of the data file and the plurality of processing threads;
- determining whether content at a byte size, of the plurality of byte sizes, indicates the row delimiter; and
- based on the content at the byte size indicating the byte size is at the row delimiter, storing the byte size in the offset array.

16. The non-transitory computer-readable medium of claim 15, wherein populating the entries of the offset array further comprises:
- based on the content at the byte size indicating the byte size is not the row delimiter, incrementing the byte size by one and determining whether second content at the incremented byte size indicates the row delimiter; and based on the second content at the incremented byte size indicating the incremented byte size is the row delimiter, storing the incremented byte size in the offset array.

17. The non-transitory computer-readable medium of claim 15, wherein determining the plurality of processing threads within the ingestion system to use to process the data file comprises determining a number of available processing threads for processing the data file, and wherein determining the one or more offsets is further based on the number of available processing threads within the ingestion system.

18. The non-transitory computer-readable medium of claim 17, wherein the processor-executable instructions, when executed, further facilitate:

capping a number of processing threads used to ingest the data file at the determined number of available processing threads;

determining a new processing thread that is available for processing the data file; and continuing to ingest the data file based on the determined number of available processing threads.

19. The non-transitory computer-readable medium of claim 15, wherein ingesting the data file comprises:

instructing a first available processing thread, from the plurality of processing threads, to begin ingesting the data file at the beginning of the data file; and instructing a second available processing thread, from the plurality of processing threads, to begin ingesting the data file at a first offset, of the one or more offsets, within the data file.

20. The non-transitory computer-readable medium of claim 15, wherein ingesting the data file is based on converting the data file into a HADOOP data file.

* * * * *